(12) United States Patent
Schmidt et al.

(10) Patent No.: US 11,902,494 B2
(45) Date of Patent: Feb. 13, 2024

(54) SYSTEM AND METHOD FOR GLINT REDUCTION

(71) Applicant: nLIGHT, Inc., Camas, WA (US)

(72) Inventors: Bodo Schmidt, Carlsbad, CA (US);
Paul S. Banks, San Marcos, CA (US);
Charles Stewart Tuvey, San Diego, CA (US)

(73) Assignee: nLIGHT, Inc., Camas, WA (US)

( * ) Notice: Subject to any disclaimer, the term of this patent is extended or adjusted under 35 U.S.C. 154(b) by 0 days.

(21) Appl. No.: 17/647,929

(22) Filed: Jan. 13, 2022

(65) Prior Publication Data

US 2022/0141446 A1  May 5, 2022

Related U.S. Application Data

(63) Continuation of application No. 16/161,615, filed on Oct. 16, 2018, now abandoned.

(60) Provisional application No. 62/573,156, filed on Oct. 16, 2017.

(51) Int. Cl.

| | |
|---|---|
| *H04N 13/254* | (2018.01) |
| *G01S 17/10* | (2020.01) |
| *G01S 7/484* | (2006.01) |
| *G01S 7/486* | (2020.01) |
| *G01S 7/499* | (2006.01) |
| *G02B 30/25* | (2020.01) |
| *G01S 17/894* | (2020.01) |

(52) U.S. Cl.
CPC ........... *H04N 13/254* (2018.05); *G01S 7/484* (2013.01); *G01S 7/486* (2013.01); *G01S 7/499* (2013.01); *G01S 17/10* (2013.01); *G01S 17/894* (2020.01); *G02B 30/25* (2020.01)

(58) Field of Classification Search
CPC ........ G01S 17/10; G01S 17/89; G01S 17/894; G01S 7/484; G01S 7/486; G01S 7/499; G01S 7/483; H04N 5/30; H04N 13/254; H04N 9/3167; G02B 30/25; G02B 27/281
USPC .................................................. 348/162, 164
See application file for complete search history.

(56) References Cited

U.S. PATENT DOCUMENTS

| | | | | |
|---|---|---|---|---|
| 6,234,634 B1 * | 5/2001 | Hansen | ................ | G02B 5/3058 353/20 |
| 6,678,057 B2 * | 1/2004 | Harding | ............. | G01N 21/9515 356/369 |

(Continued)

FOREIGN PATENT DOCUMENTS

EP        1326123 A1    7/2003

*Primary Examiner* — Nathnael Aynalem
(74) *Attorney, Agent, or Firm* — Stoel Rives LLP

(57) ABSTRACT

Systems and methods for reducing the deleterious effects of specular reflections (e.g., glint) on active illumination systems are disclosed. An example system includes an illuminator or light source configured to illuminate a scene with electromagnetic radiation having a defined polarization orientation. The system also includes a receiver for receiving portions of the electromagnetic radiation reflected or scatter from the scene. Included in the receiver is a polarizer having a polarization axis crossed with the polarization orientation of the emitted electromagnetic radiation. By crossing the polarizer with the polarization of the emitted electromagnetic radiation, the polarizer may filter out glint or specular reflections in the electromagnetic radiation returned from the scene.

12 Claims, 8 Drawing Sheets

(56) References Cited

U.S. PATENT DOCUMENTS

| | | | |
|---|---|---|---|
| 8,471,895 B2* | 6/2013 | Banks | G01S 7/4865 |
| | | | 382/284 |
| 10,104,365 B2 | 10/2018 | Banks et al. | |
| 10,218,962 B2 | 2/2019 | Banks | |
| 10,466,036 B2 | 11/2019 | Pau | |
| 2003/0128320 A1 | 7/2003 | Xiang-Dong et al. | |
| 2005/0219536 A1* | 10/2005 | Feldman | G01J 9/00 |
| | | | 356/419 |
| 2010/0128109 A1 | 5/2010 | Banks | |
| 2010/0268069 A1* | 10/2010 | Liang | G06T 7/521 |
| | | | 600/425 |
| 2012/0112096 A1* | 5/2012 | Meyers | G01N 21/21 |
| | | | 250/459.1 |
| 2012/0170116 A1 | 7/2012 | Gurton | |
| 2017/0328045 A1* | 11/2017 | Karei | G01S 7/4816 |

* cited by examiner

SYSTEM AND METHOD FOR GLINT REDUCTION

CROSS REFERENCE TO RELATED APPLICATIONS

This application is a continuation of U.S. patent application Ser. No. 16/161,615, filed Oct. 16, 2018, which claims benefit of U.S. Provisional Patent Application No. 62/573,156, filed Oct. 16, 2017, both of which are incorporated by reference herein in their entireties.

TECHNICAL FIELD

This disclosure generally relates to electromagnetic radiation sensor systems and, more particularly, to active illumination systems.

BACKGROUND INFORMATION

An active illumination system is a system in which an illuminator emits an electromagnetic signal that is reflected or otherwise returned from a scene of interest. The returned signal is sensed and processed by the system to determine useful information about the scene. In active illumination systems, glints, specular reflections or retro-reflections (such as license plates) often have a higher signal return than surfaces that scatter light (i.e., Lambertian scatters) due to their directionality of the return. This often poses a problem since the dynamic ranges of the imaging systems are not sufficient to cover both the bright specular reflections and the less bright scatter reflections. This may lead to either overexposure of the specular reflection and associated effects (such as blooming on CCD cameras, pixel saturation in a certain area) or underexposure of the scatter returns (and thus possibly not producing a desired signal-to-noise contrast).

Therefore, there is a need for techniques to reduce glint and the undesirable effects of specular reflections on active illumination systems.

DETAILED DESCRIPTION

The following detailed description is offered not to limit but only to exemplify and teach embodiments of systems and methods for reducing the effects of glint in active illumination system. The embodiments are shown and described in sufficient detail to enable those skilled in the art to practice them. Thus, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Although any methods and systems similar or equivalent to those described herein can be used in the practice the invention(s), specific examples of appropriate systems and methods are described herein.

Also, the use of "or" means "and/or" unless stated otherwise. Similarly, "comprise," "comprises," "comprising" "include," "includes," and "including" are interchangeable and not intended to be limiting.

The disclosed system(s) and method(s) describe certain techniques for reducing the specular component of a returned signal level in an active illumination system so that the specular component is comparable to the scatter reflection component. This may increase the dynamic range for both components and avoids saturation effects that could impact a captured image and the performance of the system.

Figure 1A:
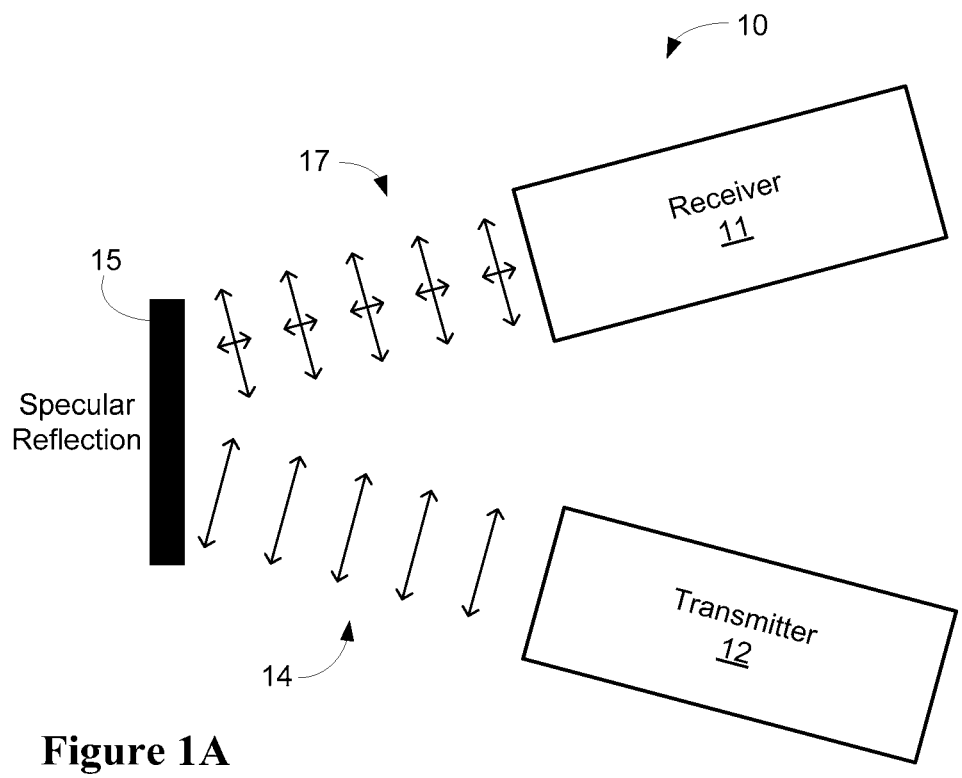
FIGS. 1A-B are schematic illustrations of an example active illumination system illuminating both specular and scattering object surfaces.
Figure 1B:
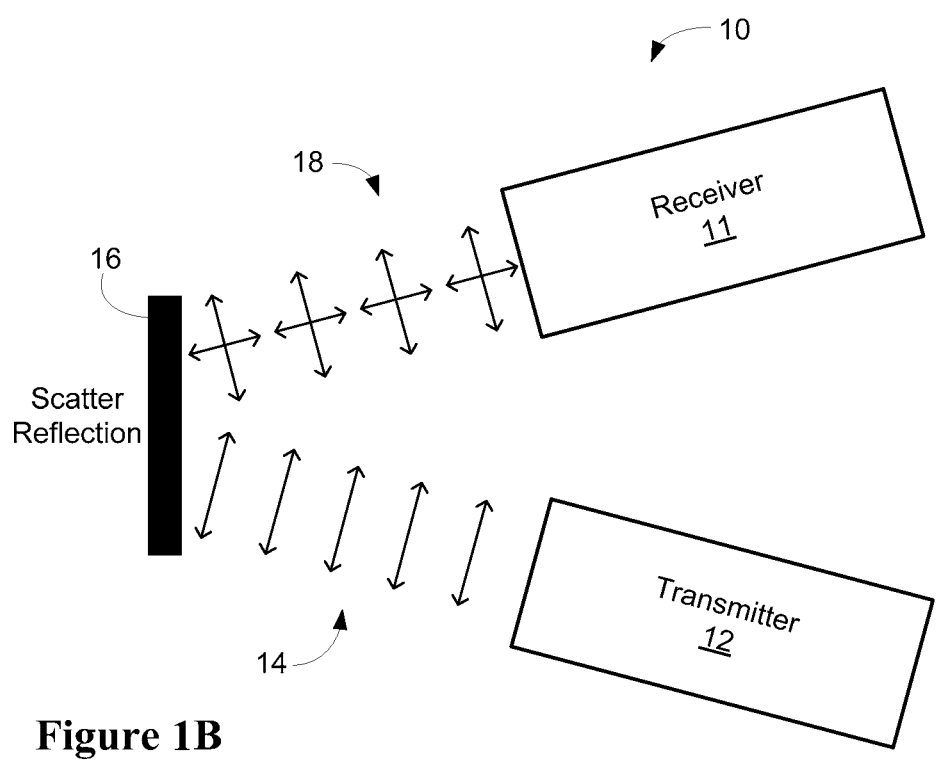

FIGS. 1A-B are schematic illustrations of an example active illumination system 10 illuminating both specular (FIG. 1A) and scattering (FIG. 1B) object surfaces 15, 16, respectively. The system 10 includes a transmitter 12 configured to transmit a polarized electromagnetic signal 14 for illuminating the surfaces 15, 16. The system 10 also includes a receiver 11 for receiving portions of the electromagnetic signal reflected or scattered 17, 18 from the surfaces 15, 16.

FIGS. 1A-B show two exemplary operational scenarios of the system 10—FIG. 1A showing a situation where the system 10 illuminates a highly reflective surface 15, and FIG. 1B showing a situation where the system 10 illuminates a less reflective surface that generally scatters incident light 14 emitted from the system transmitter 12. The receiver 11 receives returned portions 17, 18 of the illuminating light 14 emitted by the transmitter 12. The light 14 emitted from the transmitter 12 may be polarized—linearly, circularly or elliptically.

As shown in FIG. 1A, specular reflections 17, e.g., from mirrored or highly reflective surfaces, such as surface 15, typically only depolarize a small portion of the returning light reflected from the surface. This is illustrated by the longer arrows in the wave train 17 representing the predominate polarization component and the shorter arrows in the reflection wave train 17 representing another, smaller polarization component. If the incident light 14 is polarized (as illustrated by the single arrows in the incident light wave train 14), this means the returning light 17 is mainly polarized as well with the same polarized orientation, as shown by the wave train arrows in FIG. 1A. This type of reflection is often the case for man-made objects. Objects that produce undesirable glint or specular reflection include those having highly reflective surfaces, such as mirror or polished metal surfaces, corner reflectors, retroreflectors, corner cubes and the like.

Natural surfaces, e.g., scatter reflection surface 16 as shown in FIG. 1B, on the other hand, often do not have a large specular component, and the returning light 18 may be fully depolarized, as well as scattered into a large angle. This is illustrated by the equal-length arrows shown in the returned light wave train 18, which represent polarization components have similar magnitudes in the returned light.

To reduce or eliminate the glint from the specular surface 15, a high-extinction polarizer (not shown in FIGS. 1A-B) may be included in the receiver 11 of the system 10 (e.g., polarizer 172) that is positioned orthogonally to the predominate polarized component of returning light. By using a transmitter 12 that emits polarized light 14 having a known polarization, the polarizer in the receiver 11 can be crossed with the polarization of the emitted polarized light to eliminate or reduce the (polarized) specular component and thus reduce the glint signal level. The specularly reflected light level transmitted through such a polarizer may on the same order as normally scattered light. Crossed polarizers may be used, that is, one polarizer of the transmitter 12 or illuminator that emits the light to irradiate the objects in the scene is at a first polarized orientation, and the other polarizer included in the receiver 11 or sensor that detects the returned portions of the emitted light is at a second polarized orientation different from the first so that returned specular component of the received light is reduced or eliminated. The degree to which the polarizers are crossed with one another can be any suitable value. In some cases, the axes of polarization of the polarized emitted light and receiver polarizer are offset from each other by several degrees. In other cases, there is a high degree of crossing. For example, in some configurations the polarizations of the transmitter and receiver may be crossed orthogonally to each other. This may significantly reduce the specular component returned from the scene. In turn, this may cause the returned light from the objects to be within the dynamic range of the camera or sensor included in the receiver 11.

Scenes of interest for the systems disclosed herein may include both scatter and specular reflection surfaces. Although FIGS. 1A-B show two separate scenarios, one having only a specular surface and the other have only a scattering surface, the techniques, systems and methods disclosed herein can be used in any operational scenarios, including those exhibiting both types of surfaces.

Figure 2:
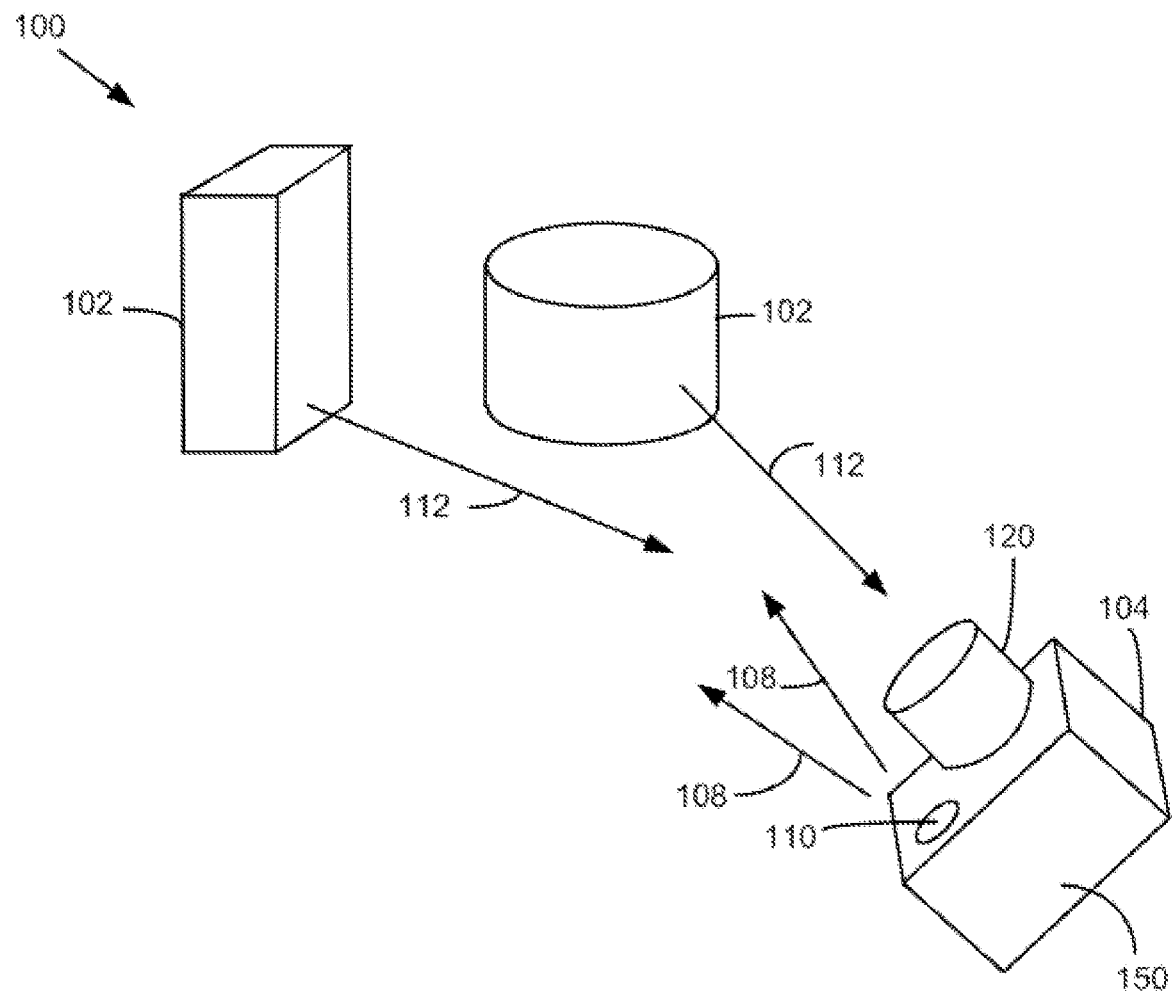
FIG. 2 illustrates a perspective view of an exemplary system for processing an image to reduce or eliminate the effects of glint.

FIG. 2 illustrates a perspective view of an exemplary system 104 for processing an image to reduce or eliminate the effects of glint (specular reflections from certain objects in a scene). The system 104 may be a camera or other imaging system used to capture an image of scene 100, which includes one or more objects 102. The scene 100 may be irradiated by illumination light 108 emitted from an illumination subsystem 110 included in the imaging system 104. Light, both ambient light and illumination light 108, is reflected or scattered from objects 102 in the scene, shown in FIG. 2. Some of the light from the objects 102 is received by the imaging system 104, shown as rays 112, and may be incident on a sensor subsystem 120 included in the imaging system 104.

The system 104 includes the illumination subsystem 110, the sensor subsystem 120, a processor subsystem 140 (shown in FIG. 3), and body 150 in which the various subsystems are mounted. The body 150 may further include a protective cover, not shown. The particular form of system 104 may vary depending on the desired performance parameters and intended application. For example, the system 104 may be sufficiently small and light as to be held by a single hand, similar to a camcorder, and may be configured to record relatively close scenes with acceptable resolution. Alternatively, the system 104 may be configured with a larger or smaller form factor.

The imaging system 104 is configured to reduce or eliminate the specular reflections from the objects which may negatively affect the system performance. To accomplish this, the system 104 includes an illuminator that emits polarized light with a defined polarization. The sensor subsystem 120 includes a polarizer 172 (FIG. 3) that may be crossed orthogonally with the polarization of the emitted polarized light. This configuration reduces the glint from specular reflections in the scene 100. The emitted light 108 may be a pulse of light or any other suitable electromagnetic radiation emission or signal having a predefined polarization.

Both 2D and 3D imaging systems that reduce or eliminate glint in images using the disclosed methods and systems are described herein. In addition, the systems and methods disclosed herein can also be applied to 1D imaging systems (e.g., line imagers such as barcode scanners).

Figure 3:
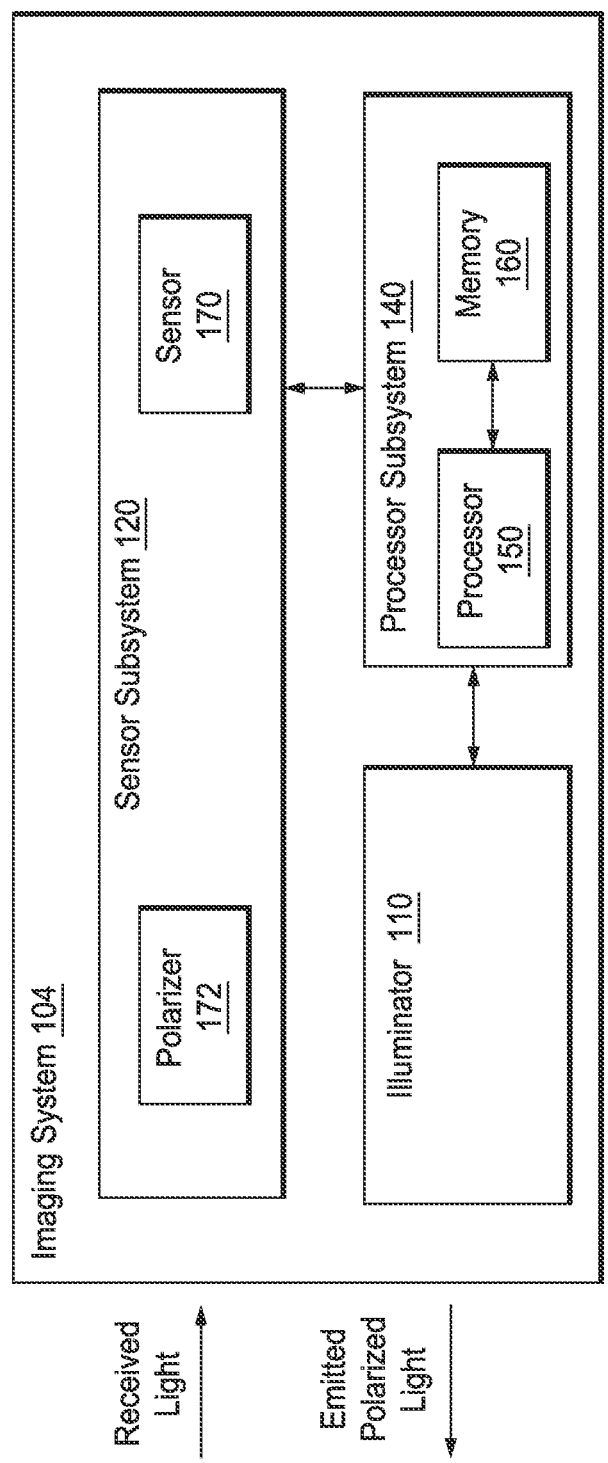
FIG. 3 is a schematic block diagram illustrating certain components of the imaging system shown in FIG. 2.

FIG. 3 is a schematic block diagram illustrating certain components of the imaging system 104 shown in FIG. 2. The system 104 may be configured to capture 1D, 2D or 3D images. Specific examples of certain 3D imaging systems that employ glint reduction methods are described herein in greater detail below with reference to other figures. The system 104 includes the sensor subsystem 120, the illumination subsystem (e.g., illuminator) 110, and a processor subsystem 140.

The illuminator 110 includes a light source that is configured to illuminate the scene 100 with a predefined polarized electromagnetic signal, for example, one or more polarized light pulses. The light pulses may be linearly polarized with a predefined polarized orientation, for example, a particular axis of polarization. Alternatively, the light pulses may be circularly or elliptically polarized in some embodiments.

The sensor subsystem 120 includes a polarizer 172 that is crossed with polarization of the emitted light pulses from the illuminator 110. The sensor subsystem 120 also includes a sensor 170 receiving light passed through the polarizer 172. The sensor 170 is configured to output one or more images in response to received light. The processor subsystem 140 includes a processor 150 that is configured to process images from the sensor 170 to form a captured image. The processor 150 may do this by causing the illumination subsystem 110 to emit a light pulse from the illuminator 162. The processor then causes the sensor subsystem 120 (and the sensor 170 therein) to capture an actively illuminated image of the scene 100, where the actively illuminated image includes portions of the light pulse reflected or scattered from the scene 100.

The illuminator 110 includes a light source (not shown) and may include transmission (Tx) optics (not shown), which may include a transmission lens (not shown) such as a single lens, a compound lens, or a combination of lenses. The illuminator 110 may also include other optical elements such as diffusers, beamshapers, and/or the like that affect characteristics of light emitted by the subsystem 110.

The light source may be any suitable light source, such as one or more lasers, light emitting diodes (LEDs), vertical cavity surface emitting laser (VCSELs), strobe lights, or the like, but not limited thereto. The illuminator 110 may be configured to generate one or more light pulses (e.g., laser pulses). Any suitable light pulse can be used. For example, for 3D imaging applications the emitted light pulses may each be about or less than 100 ns in duration. E.g., each light pulse may have a relatively short duration such as a duration of 2 nanoseconds or less, for example, between 1 nanosecond and 50 picoseconds.

Other pulse durations may be used depending on the application, such as longer pulses in the microsecond range. For more traditional imaging applications, a pulse width of 10s of microseconds may be used. For some applications the pulse duration may be as long as 33 ms (the standard frame time of a camera operating at 30 frames/second).

Any suitable portion of the electromagnetic spectrum can be used for the light pulses, for example, a light pulse may be visible light, infrared, ultraviolet radiation, any overlap of these spectrums, or the like. Also, the spectral bandwidth of the light used for the pulses can be any suitable value, depending on the application. For some imaging applications, the spectral bandwidth may be a few nanometers to allow for a spectral filter to be used in the sensor subsystem 120. In some applications, e.g., indoor usage of the system 104, the spectral bandwidth of the illuminator 162 may be configured so that it does not coincide or has less overlap with some of the typical output spectrums of artificial light sources such as fluorescent lights and LED lighting.

The transmission optics may include a Tx lens and/or other optical elements that are configured to match the divergence of a light pulse emitted from the illuminator 110 to the field of view (FOV) of the sensor subsystem 120. The divergence of a light pulse may be any suitable value, for example, any angle of 1 degree or greater, for example, between 1 and 180 degrees, or between 1 and 120 degrees, or between 2 and 90 degrees, or between 2 and 40 degrees, or between 5 and 40 degrees.

The illuminator 110 emits a light with a predefined polarization. In some embodiments, the illuminator 110 includes a light source that emits polarized light, e.g., a laser or laser diode. In other embodiments, the illuminator 110 includes a polarizer (e.g., such as any of the example polarizers described herein for polarizer 172) that is crossed orthogonally with the sensor subsystem polarizer 172, for polarizing light emitted from the light source. In these embodiments, a non-polarized light source may be used. In other embodiments, a polarizer may be used with a polarized or partially polarized light source.

The polarizer 172 filters light received from the scene prior to it reaching the sensor 170. The polarizer 172 may be placed at different locations along the optical axis of the sensor subsystem 120, e.g., in front of other components or after them, as long as received light passes through the polarizer 172 prior to being received at the sensor 170.

Any suitable type of polarizer may be used in the illuminator 110 or as the polarizer 172. The polarizers may be linear, circular or elliptical polarizers. For instance, different types of polarizers may be used as the polarizer 172 to filter the returning light from a scene. For example, a linear polarizer transmits only the portion of incident light that is projected along its pass axis, regardless of the incident light's degree or state of polarization. This portion can be anywhere from nearly 100% of the incident light to very nearly zero.

Depending on the type of polarizer, the remainder (non-transmitted light) can be reflected, refracted or absorbed. For example, a plastic sheet polarizer rejects the unwanted component by absorption, and typically transmits less than 75% even along the pass axis. Wire grid polarizers reflect and transmit orthogonal linear polarization states, and can work in strongly converging beams across a wide wavelength range, but have low extinction ratios especially at shorter wavelengths approaching the dimension of the grid spacing. The extinction ratios of these polarizers may be around 500:1. Thin film polarizers separate the portions into reflected and transmitted beams, usually with better than 98% efficiency, but work well only within a limited spectral and angular range. Crystal polarizers either reflect or refract the rejected portion, without significant absorption of either portion, and can achieve extinction ratios on the order of $10^6$:1 over a broad spectral range, but only over a small range of incident angles. Crystal polarizers come in many forms, each with unique characteristics. A thin film polarizer plate is simple and inexpensive, consisting of a plane parallel glass plate with a coating on one side. It has high transmittance for P polarization, high power handling capacity and a high extinction ratio. The plate is designed for oblique incidence, usually at Brewster's angle. One surface receives a thin film polarizer coating. The transmitted light is laterally displaced by about 0.43 times the plate's thickness for glass, but undeviated in direction.

A polarizer with any suitable extinction ratio may be used, for example, an extinction ratio between about 500:1 to on the order of $10^6$:1, for instance, about $10^4$:1, i.e., ±one order of magnitude.

A thin film polarizing beamsplitter prism may be used as the polarizer 172 and offers wider spectral bandwidth than the thin film polarizer plate. The transmitted light is not displaced or deviated. The cube style design reflects the S polarized light at 90° to the incoming beam. Deflection angles other than 90°, while somewhat less convenient in system layout and alignment, offer considerable performance advantages. Prisms with optically contacted or air-gap interfaces achieve much higher power handling capabilities than those with cemented interfaces.

The sensor subsystem 120 may include also receiving (Rx) optics (not shown) in addition to the polarizer 172 and image sensor 170. The Rx optics may include a receiving lens (not shown) that collects reflected pulse portions from the scene 100. The receiving lens may be a non-collimating lens that focuses the incoming light into an image. The appropriate aperture size of the lens may depend on the particular application, and may be between, for example, 1 cm and 2.5 cm. Other portions of the reflected or scattered light pulse, e.g., those portions that are reflected in directions other than back toward system 104, may not be captured by receiving optics. Like the transmission lens, the receiving lens may include a single lens, a compound lens, or a combination of lenses or other reflective or refractive elements.

The Rx optics may also include other optical elements such as one or more spectral or band pass filters (BPFs), beamsplitters, additional polarizers, or the like that affect characteristics of incoming light received by the sensor subsystem 120. In some embodiments, the spectral filter(s) may be matched to the bandwidth of the pulses emitted from the illumination subsystem 110 such that filter passes light in the pulse bandwidth while blocking light outside the pulse bandwidth.

In other embodiments, Rx optics may also collect broadband or multiband (e.g., visible) information about scene 100, e.g., unfiltered ambient light that scene 100 scatters or reflects towards receiving optics 172. As such, the receiving lens preferably is configured to reduce or eliminate possible aberrations known in the art of optical system design that may degrade image quality for one or more of the bands received.

The image sensor 170 creates a plurality of digital images based on light 112 it receives from the scene 100. The light 112 may include ambient light and returned light pulse portions that that receiving optics collect. These images contain positional information about objects 102 in scene 100. The image sensor 170 utilizes a focal plane array (FPA) to obtain an image which provides a signal in response to light illumination that is then digitized. The FPA includes an array of light-detecting elements, or pixels, positioned at a focal plane of the Rx optics that image a scene. Each pixel of the sensor 170 determines an illumination intensity signal that indicates the intensity of light received by the pixel.

The image sensor 170 may be an off-the-shelf CCD or CMOS imaging sensor. In particular, such sensors may be readily commercially available for visible-wavelength applications, and require no significant modification for use in system 104. In one example, image sensor 170 is a commercially purchased CMOS sensor from Sony Corporation having megapixel resolution. Some sensors for use in near-infrared applications are commercially available, albeit at substantially greater cost than the ubiquitous visible-wavelength sensors, and others are currently being developed. It is anticipated that any of a type of optical sensor, including those yet to be invented, may be used successfully with the systems disclosed herein. Generally, the image sensor 170 includes an array of pixels, where each pixel can determine the intensity of received light thereon. An image sensor array may include any suitable number of pixels, and contemporary sensors often include millions of pixels. The performance of the image sensor 170 may be characterized by a frame rate, which is how many times the pixel array of the sensor 170 may be read per second; and also characterized by a frame time, which is the amount of time it takes to read the pixel array.

In some embodiments, the image sensor 170 does not include internal storage and the image data from the pixel array must be read out and processed by the processor 150. In other embodiments, the image sensor 170 includes on-board memory for storing one or more images captured by the pixel array so that a prior image does not have to be read-out from the sensor 170 before a second image is captured. In a further embodiment, the image sensor 170 may include the on-board memory for storing one or more images captured by the pixel array and a processor for performing image processing functions typically performed by the processor subsystem 140.

The processor subsystem 140 includes processor 150 coupled to a memory 160. The processor 150 receives digital image data from the sensor subsystem 120, and may store the image data in the memory 160 and perform further processing on the image data to remove ambient light and enhance the image of the scene 100. For example, processor subsystem 140 may normalize stored images to compensate for variations in reflectance or scattering between objects 102. Normalization may be particularly useful where variations in reflectance or scattering from objects 102 are due to active illumination versus ambient illumination. The processor subsystem 140 may also calculate image parameters based on the normalized images. For example, the processor 150 may be configured to perform digital filtering on image data prior. For example, if ambient light intensity is low and noisy, filtering out the noise in the ambient and actively illuminated images may improve image quality.

Further, the processor subsystem 140 may process image data that includes grayscale or color information about the scene 100. The processor subsystem 140 may further control and coordinate the operation of illumination subsystem 110 and sensor subsystem 120, as described herein. For example, adjusting the illumination intensity might be useful.

The functions of the processor subsystem 140 may be implemented in hardware, software, firmware, or any suitable combination thereof. If implemented in software, the functions may be stored as one or more instructions or code on a computer-readable medium (e.g., memory 160) and executed by a hardware-based processing unit (e.g., processor 150). Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The processor 150 may include one or more processors for executing instructions or code, such as one or more digital signal processors (DSPs), general purpose microprocessors, application specific integrated circuits (ASICs), field programmable logic arrays (FPGAs), or other equivalent integrated or discrete logic circuitry. The memory 160 and processor 150 may be combined as a single chip. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits, including logic circuits and/or logic elements.

Figure 4:
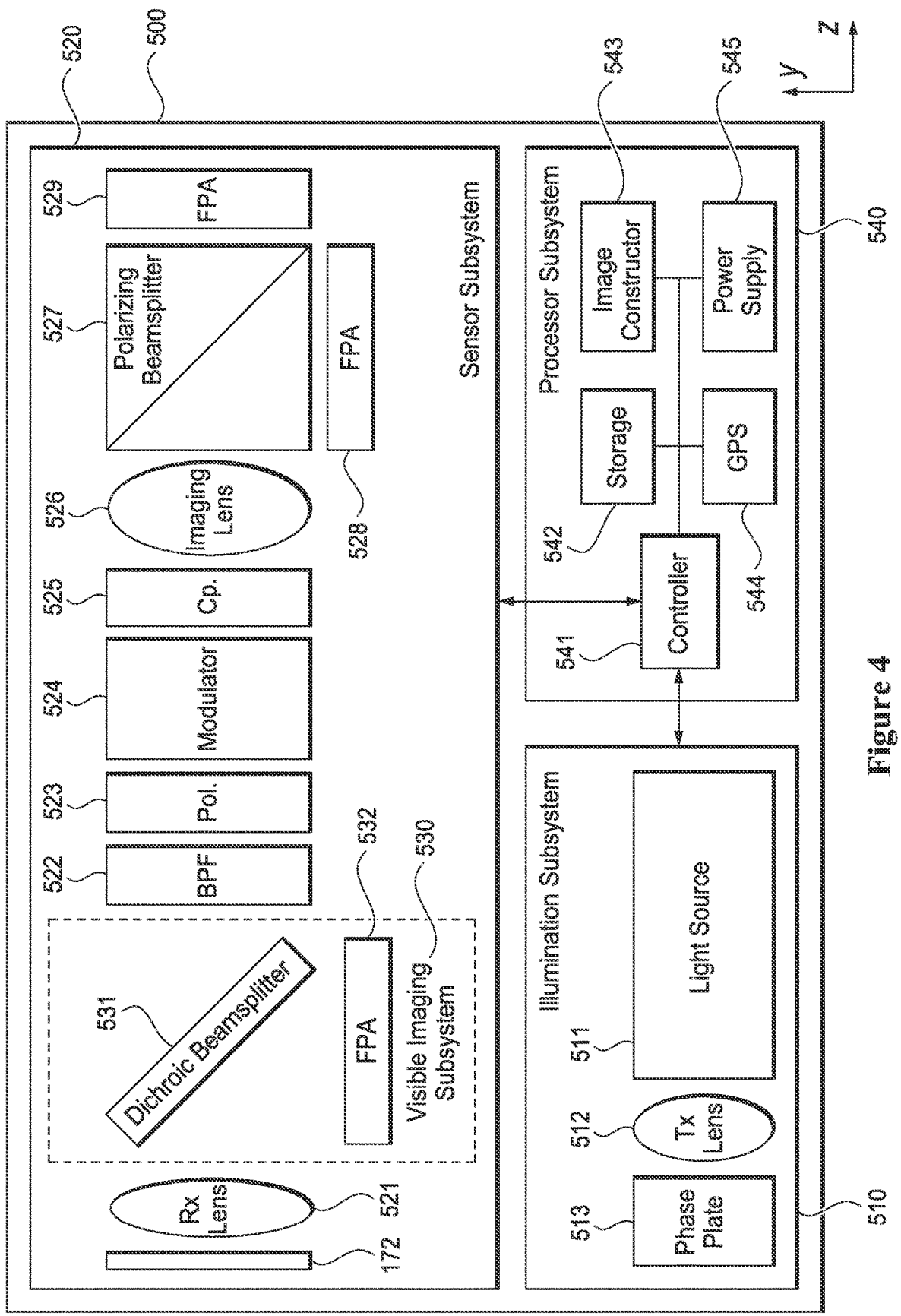
FIG. 4 schematically illustrates an exemplary 3D (three-dimensional) imaging system employing at least one of the disclosed techniques for mitigating the effect of glint on image capture.

FIG. 4 schematically illustrates an exemplary 3D imaging system 500 employing the disclosed techniques for mitigating the effect of glint on image capture. Capturing the 3D position of surfaces and objects in a scene is becoming more and more commonplace for imaging applications. The system 500 can be used in applications such as robotic vision, autonomous vehicles, surveying, and video game controls. The system 500 is able to capture the 3D information along with images or video in high resolution in the same way two dimensional (2D) video cameras and cell phone cameras function today. Size, weight, and power requirements for the system 500 are relevant considerations, and may depend on the application in which the system 500 is used.

The system 500, as well as any of the other 3D systems disclosed herein, can be a LIDAR system for measuring distances to objects in a scene by illuminating those objects with a pulsed laser light, and then measuring the reflected pulses with a sensor. Differences in laser return times can be used to make digital 3D-representations of the target scene. The LIDAR embodiment of the system 500 is useful in automotive applications, particularly using the system 500 as a sensor on an autonomous vehicle to detect and sense objects and their positions around the vehicle. In such an application, one or more of the systems can be mounted on the vehicle to cover fields of view around the vehicle. The system 500 can detect objects and their positions around the vehicle in real-time as the vehicle moves along roadways and in traffic.

FIG. 4 schematically illustrates selected components of the three-dimensional imaging system 500. The operation and functions of the system 500 and its components are described in further detail in U.S. Pat. No. 8,471,895 B2, which is incorporated by reference in its entirety as if fully set forth herein (referred to herein as the "'895 patent"). However, the system 500 described here differs from the 3D imaging systems disclosed in the '895 patent in that it is modified to perform the method(s) disclosed herein for reducing or eliminating glint from specular reflections in images, as described below.

It should be appreciated that the functionality of system 500 may alternatively be provided with other optical arrangements, for example as described below with reference to the other figures. As illustrated in FIG. 4, system 500 includes illumination subsystem 510, sensor subsystem 520, and processor subsystem 540. Each of these subsystems will now be described in greater detail.

The illumination subsystem 510 emits polarized light, and includes light source 511 for generating a light pulse, transmission (Tx) lens 512 for controlling the divergence of the generated light pulse, and optional phase plate or other beamshaping element 513 for enhancing the spatial profile of the light pulse. The positions of lens 512 and optional phase plate 513 may alternatively be reversed. These elements may also be combined in a single optic or set of optics. Illumination subsystem 510 is in operable communication with controller 541, which may control and/or monitor the emission of light pulses from light source 511, and which further may control and/or monitor the divergence that transmission lens 512 imparts on the generated light pulse. The illumination subsystem 510 outputs a predefined polarized light signal and may include a polarized light source and/or polarizer (not shown) for polarizing light from a non-polarized light source. In embodiments of the illumination subsystem 510 that include a polarizer, the polarizer may be any of those described herein for polarizer 172. In such an embodiment, the polarizer may be located along the optical axis of the subsystem 510 in front of the light source 511.

The illumination subsystem 510 preferably generates a light pulse having a smooth spatial profile, a smooth temporal profile, and a divergence of between, for example, 5 and 40 degrees. The light pulse may be in any suitable portion of the electromagnetic spectrum, for example, in the visible band (e.g., 400-700 nm) or in the near-infrared band (e.g., 700 nm-2500 nm). Generally, pulses generated in specific regions of the near-infrared band are considered to be more "eye-safe" than pulses of comparable power in the visible band. Light source 511 is configured to generate a light pulse in the desired electromagnetic band, and lens 512 and optional phase plate 513 are configured to provide that light pulse with the desired divergence and optionally further to enhance the pulse's spatial profile. In some embodiments, light source 511 is a laser producing light pulses having at least 5 µJ energy, or at least 100 µJ energy, or at least 1 mJ energy, or at least 10 mJ energy. Such laser energies may be relatively eye-safe because of the high divergence of the laser beam.

A low-coherence laser that may be used as light source 511, as described in connection with FIGS. 6A-C of the '895 patent, which subject matter is expressly incorporated herein by reference. A low-coherence laser may be configured to provide high output power or energy for a relatively low cost, both for pulsed and continuous wave (CW) laser devices. Lower spatial coherence may also reduce the focus-ability of the laser on the retina of the eye, thereby improving eye safety. The three-dimensional imaging system 500 is an example of a wide field-of-view system in which the reduced spatial and/or temporal coherence of a laser may be useful.

Illumination subsystem 510 may generate a laser pulse having a large divergence, e.g., between 1 and 180, or between 1 and 90, or between 1 and 40, or between 2 and 40, or between 5 and 40 degrees of divergence, and low spatial and/or temporal coherence, whereas a diffraction-limited laser may have a divergence of only a fraction of a degree and a large amount of spatial and temporal coherence. The large divergence and lack of spatial and/or temporal coherence may reduce the amount of intensity fluctuations in the laser irradiance at the surfaces of objects being illuminated with the laser beam. The smoother intensity profile of the laser beam generated by illumination subsystem 510 may improve the performance of sensor subsystem 520.

In some configurations, a low coherence laser may generate pulses having a wavelength of 1400 nm or greater, an energy of 40 mJ or greater, and a pulse duration of less than 500 picoseconds. There are several gain media that emit in this spectral region, including Er:YAG, Cr:YAG, and Tm,Ho:YAG. For example, the material Er:YAG has been used to produce pulses at 1617 nm having 1 nanosecond pulse lengths and 0.6 mJ output at 10 kHz pulse repetition frequencies. However, Er:YAG offers relatively low gain, making it difficult to scale to higher pulse energies for even shorter pulse lengths, e.g., 500 picoseconds or shorter. The other listed materials may have similar constraints.

Referring again to FIG. 4, transmission (Tx) lens 512 may increase the divergence of the light pulse generated by light source 511 (e.g., a low coherence laser or any other suitable laser, including a high coherence laser). For example, although the light pulse from light source 511 may be relatively highly divergent compared to some previously known lasers because the pulse contains many spatially and temporally incoherent modes, the pulse's divergence may in some circumstances still remain well below 1 degree. Lens 512 may be configured to increase the divergence of the light pulse to between 5 and 40 degrees, depending on the distance of the scene from system 500 and the portion thereof to be imaged. Lens 512 may include a single lens, or may include a compound lens, or may include a plurality of lenses or mirrors, that is/are configured to increase the divergence of the pulse to the desired degree, e.g., to between 1 and 180 degrees, or 1 and 120 degrees, or 1 and 90 degrees, or 2 and 90 degrees, or 2 and 40 degrees, 5 and 40 degrees, or between 5 and 30 degrees, or between 5 and 20 degrees, or between 5 and 10 degrees, or between 10 and 40 degrees, or between 20 and 40 degrees, or between 30 and 40 degrees, or between 10 and 30 degrees, for example. Divergences larger or smaller may also be used. In some embodiments, transmission lens 512 may be adjustable, so that a user may vary the divergence of the laser pulse to suit the particular situation. Such an adjustment may be manual (similar to the manual adjustment of a "zoom" lens), or may be automated. For example, controller 541 may be operably connected to transmission lens 512 so as to automatically control the degree of divergence that lens 512 imparts to the laser pulse. Such automatic control may be responsive to user input, or may be part of an automated scene-imaging sequence.

Illumination subsystem 510 optionally may further include phase plate 513, which is configured to further smooth the spatial profile of the light pulse generated by light source 511.

It should be noted that although illumination subsystem 510 includes light source 511, which is substantially monochromatic, it optionally may include additional types of light sources. For example, illumination subsystem 510 may include a white light source for illuminating the scene with white light. Or, for example, illumination subsystem 510 may include other substantially monochromatic light sources in spectral regions different from that emitted by light source 511. For example, where light source 511 generates laser pulses in one particular portion of the visible spectrum, such as in the green region, e.g., 532 nm, such pulses may cast that hue over the scene. In some circumstances, such as the filming of a movie, this may be undesirable. Illumination subsystem 510 may include one or more additional light sources that generate light that, when combined with the light from light source 511, result in the appearance of white light. For example, where light source 511 generates green laser pulses (e.g., 532 nm), illumination subsystem 510 optionally may further include diodes or lasers or other light sources that emit wavelengths in the red and blue regions, e.g., 620 nm and 470 nm, that, combined with the green laser pulses to produce an illumination that maintains the desired scene illumination characteristics. The illumination system 510 may include the light sources described for the system 104.

Still referring to FIG. 4, system 500 further includes the sensor subsystem 520, which may receive ambient light from a scene along with portions of the light pulse, generated by illumination subsystem 510, that are reflected and/or scattered by objects in the scene. The ambient light may be visible light from the scene, which light may be from ambient sources as described herein above.

The example sensor subsystem 520 may include polarizer 172, receiving (Rx) lens 521, band-pass filter (BPF) 522, polarizer (Pol.) 523, modulator 524, optional compensator (Cp.) 525, optional imaging lens 526, polarizing beamsplitter 527, and first and second FPAs 528, 529. Sensor subsystem optionally further optionally includes white light imaging subsystem 530, which includes optional dichroic beamsplitter 531 and FPA 532. Sensor subsystem 520 is in operable communication with controller 541, which may monitor and/or control the operation of different components of the sensor subsystem 520, such as receiving lens 521, modulator 524, optional imaging lens 526, FPAs 528, 529, and optional FPA 532.

The polarizer 172 is orthogonally crossed with the polarized light emitted from the illumination subsystem 510. Although shown at the front of the sensor subsystem 520, the polarizer 172 may be placed elsewhere along the optical axis of the subsystem 520, as long as it is in front of the sensor FPAs.

The receiving lens 521 may be a non-collimating lens that collects light from the scene and focuses it into an image. The scene may scatter and/or reflect light in a variety of directions other than back toward the three-dimensional imaging system 500. Some of such light may be generated by illumination subsystem 510, while other of such light may be white light or light in a different wavelength range, which may or may not have been generated by illumination subsystem 510. The amount of light collected is proportional to the area of the receiving aperture, e.g., is proportional to the area of receiving lens 521.

To enhance the amount of light collected by sensor subsystem 520, thus increasing the amount of information that ultimately may be contained in each three-dimensional image, receiving lens 521 is constructed to receive as much light as practicable for the given application. For example, for some applications in which the imaging system is designed to be lightweight and hand-held, with modest resolution requirements, receiving lens 521 may, for example, have a diameter of 1 to 4 inches, or 2 to 3 inches, or for example, about 2 inches, or smaller. For applications in which the imaging system is instead designed to provide high-resolution images for commercial purposes, receiving lens 521 may be made as large as practicably feasible, for example, having a diameter of 2 to 6 inches, or 2 to 4 inches, or 1 to 3 inches, or, for example, 4 inches. The various optical components of sensor subsystem 520 preferably are configured so as to avoid clipping or vignetting the light collected by receiving lens 521 using techniques known in optical design. Additionally, receiving lens 521 and the other optical components or coatings preferably also have a wide angular acceptance, e.g., of between 1 and 180 degrees, or between 1 and 120 degrees, or between 1 and 90 degrees, or between 2 and 40 degrees, or between 5 and 40 degrees.

Receiving lens 521 may include a single lens, or may include a compound lens, or may include a plurality of lenses or mirrors, that is/are configured to collect light from the scene and to image the collected light into an image plane at a defined position within sensor subsystem 520. Receiving lens 521 preferably is configured to reduce or inhibit the introduction of spherical and chromatic aberrations onto the collected light. In some embodiments, receiving lens 521 may be adjustable, so that a user may choose to adjust the position of the object plane of lens 521, or the distance at which the scene is imaged to the defined plan within sensor subsystem 520. In some embodiments, receiving lens 521 can be adjusted to change the angular FOV. Such an adjustment may be manual (similar to the manual adjustment of a "zoom" lens), or may be automated. For example, controller 541 may be operably connected to receiving lens 521 so as to automatically control the position of the object plane of lens 521 or angular FOV of lens 521. In some embodiments, these adjustments may be performed in part based on the beam divergence imparted by transmission lens 512 (which also may be controlled by controller 541). Such automatic control may be responsive to user input, or may be part of an automated scene-imaging sequence, as described in greater detail below.

Sensor subsystem 520 includes an optional visible imaging subsystem 530, so the light collected by receiving lens 521 is imaged at two image planes. Specifically, the collected light passes through dichroic beamsplitter 531, which is configured to redirect at least a portion of the collected visible light onto FPA 532, which is positioned in the image plane of receiving lens 521. FPA 532 is configured to record a color or grey-scale image of the scene based on the visible light it receives. In some embodiments, FPA 532 is substantially identical to first and second FPAs 528, 529, and is configured so that the visible light image it records is registered with the images that the first and second FPAs record. FPA 532 is in operable communication with controller 541, which obtains the image from FPA 532 and provides the obtained image to storage 542 for storage, which may be accessed by image constructor 543 to perform further processing, described in greater detail below. It should be appreciated that visible imaging subsystem 530 alternatively may be configured to obtain an image based on any other range of light, for example, any suitable broadband or multiband range(s) of light.

Light that dichroic beamsplitter 531 does not redirect to FPA 532 is instead transmitted to band-pass filter 522, which is configured to block light at wavelengths other than those generated by illumination subsystem 510 (e.g., has a bandwidth of ±5 nm, or ±10 nm, or ±25 nm), so that the remainder of sensor subsystem 520 receives substantially only the laser pulse portions generated by illumination subsystem 510 that the scene reflects or scatters back towards system 500 and ambient background light in the same frequency band. The light transmitted through band-pass filter 522 is then transmitted through polarizer 523, which eliminates light of polarization other than a desired polarization, e.g., so that the light transmitted therethrough is substantially all H-polarized, or substantially all V-polarized (or right handed circularly polarized, or left handed circularly polarized). Polarizer 523 may be, for example, a sheet polarizer, or a polarizing beamsplitter, and preferably is relatively insensitive to angle. The light transmitted through polarizer 523 is then transmitted through modulator 524, which is positioned at the other image plane of receiving lens 521. The functionality of modulator 524 is described in greater detail below. The image plane of receiving lens 521 may be at a location in sensor subsystem 520 other than in modulator 524.

The modulator 524 optionally may be followed by compensator (Cp.) 525, which may correct phase errors that modulator 524 may impose on the beam due to variations in the beam angle, thus further enhancing the acceptance angle of modulator 524. Compensator 525 may include a material having the opposite birefringence of the material in modulator 524. For example, where modulator 524 includes potassium dihydrogen phosphate (KDP), compensator 525 may include magnesium fluoride ($MgF_2$) which has the opposite birefringence of KDP and is commercially available. Other materials may be suitable for use in compensator 525, depending on the characteristics of the material used in modulator 524, such as if the modulator material is potassium dideuterium phosphate (KD*P), compensator materials may be rutile, yttrium lithium fluoride (YLF), urea, or yttrium orthovanadate ($YVO_4$), among others. Additionally, the thickness of compensator 525 may be selected to provide an appropriate contrast ratio over the acceptance angle of the system. For other modulator designs, such as modulator materials that are oriented such that the crystal axis is orthogonal to the optical axis, the compensator may be a second modulator with the crystal axis rotated 90 degrees about the optic axis.

Following transmission through and modulation by modulator 524 and optional compensator 525, imaging lens 526 images the modulated light onto first and second FPAs 528, 529. Specifically, polarizing beamsplitter 527 separates the orthogonal polarization components of the modulated beam (e.g., the H- and V-polarization components, or left- or right-handed circularly polarized components), which it then redirects or transmits, respectively, to first and second FPAs 528, 529, which are positioned in the image plane of imaging lens 526. Imaging lens 526 may include a single lens, a compound lens, or a plurality of lenses. In some configurations, two imaging lens 526 may be placed after the polarizing beamsplitter 527, with one each in front of FPAs 528, 529. First and second FPAs 528, 529 record images of the modulated light imaged upon them, and are in operable communication with controller 541, which obtains the recorded images and provides them to storage 542 for storage and further processing by image constructor 543.

A description of various embodiments of modulator 524 and FPAs 528, 529 will now be provided. A description of the calculation of object positions and shapes within the scene is provided in the '895 patent with reference to processor subsystem 540, which subject matter is expressly incorporated by reference herein. As described in the '895 patent, the modulator may be used to vary the polarization of the laser pulse portions reflected from the scene, allowing for the ranges and shapes of objects in the scene to be calculated with high precision. A Pockels cell or a Kerr cell may in some embodiments be used to perform such a modulation. However, previously known Pockels cells typically have relatively small apertures (e.g., 1 cm or smaller) and small acceptance angles (e.g., less than 1 degree) and operate at relatively high voltages, which may make them undesirable for use in imaging systems. Additionally, the angular extent of the reflected light received by the modulator may be magnified by the inverse of the magnification of the receiving optical elements. As such, it may be desirable to use a modulator having a wider acceptance angle, a wider aperture, and a lower operating voltage. For example, in the three-dimensional imaging system illustrated in FIG. 4 the light captured by receiving (Rx) lens 521 may have angles varying between 5 and 40 degrees and an aperture of 2-4 inches, for example. Thus, it may be desirable to provide a polarization modulator having a large aperture, a low operating voltage, and a large acceptance angle, e.g., greater than 5 degrees, for example, between 5 and 40 degrees, while providing a high contrast ratio, e.g., greater than 300:1, or greater than 500:1.

Configurations of the system 500 in which the modulator 524 is a Pockels cell are further described in the '895 patent, which subject matter is expressly incorporated herein by reference. Although system 500 of FIG. 4 is described in the '895 patent as including a Pockels cell-based modulator, other types of modulators and/or modulation schemes may be used to encode the TOFs of reflected/scattered pulse portions from the scene as an intensity modulation on an FPA, as is further described in the '895 patent, which subject matter is also expressly incorporated herein by reference.

The first and second FPAs 528, 529 are positioned in the focal plane of imaging lens 526, and respectively receive light of orthogonal polarizations. For example, polarizing beamsplitter 527 may direct light of H-polarization onto FPA 528, and may transmit light of V-polarization onto FPA 529. FPA 528 obtains a first image based on a first polarization component, and FPA 529 obtains a second image based on the second polarization component. FPAs 528, 529 provide the first and second images to processor subsystem 540, e.g., to controller 541, for storage and further processing, as described in greater detail herein. Preferably, FPAs 528, 529 are registered with one another. Such registration may be performed mechanically, or may be performed electronically (e.g., by image constructor 543).

The FPAs 528, 529 may be off-the-shelf CCD or CMOS imaging sensors. In particular, such sensors may be readily commercially available for visible-wavelength applications, and require no significant modification for use in system 500. In one example, FPAs 528, 529 may be commercially purchased CCD or CMOS sensors having multi-mega pixel resolution, e.g., 2 Megapixel resolution. Some sensors for use in near-infrared applications are currently commercially available. It is anticipated that any of a variety of sensors, including those yet to be invented, may be used successfully in many embodiments of the present invention. Optional FPA 632 may in some embodiments be the same as FPAs 528, 529.

However, sensors having a particular set of characteristics may in some circumstances be preferred. For example, as noted above, providing a focal plane array in which each pixel has a deep electron well, e.g., greater than 100,000 electrons, may enhance the signal to noise ratio obtainable by the system. The focal plane array also, or alternatively, may have a high dynamic range, e.g., greater than 40 dB, or greater than 60 dB. Additionally, wells of such effective depths may be obtained by combining the outputs of pixels of shallower depth (e.g., 4 pixels each having a well depth of 25,000 or more electrons). Preferably, each pixel of the FPA is designed to substantially inhibit "blooming," so that the electrons of any pixels that may become saturated do not bleed over into adjacent pixels.

The processor subsystem 540 includes controller 541, storage 542, image constructor 543, GPS unit 544, and power supply 545. Not all of such components need be present. The functionalities of such components may alternatively be distributed among other components of system 500, including but not limited to on-board processors on FPAs 528, 529. As described above, controller 541 may be in operable communication with one or more elements of illumination subsystem 510, such light source 511 and transmission (Tx) lens 512, and/or of sensor subsystem 520, such as receive (Rx) lens 521, optional FPA 532, modulator 524, and first and second FPAs 528, 529. For example, modulator 524 may be configured to modulate the polarization of light pulse portions transmitted therethrough as a function of time, responsive to a control signal from controller 541. The controller 541 may send a control signal to voltage source, which applies appropriate voltages to Pockels cells in the modulator 524. Controller 541 is also in operable communication with storage 542, image constructor 543, optional GPS unit 544, and power supply 545.

Controller 541 is configured to obtain images from optional FPA 532 and first and second FPAs 528, 529 and to provide the images to storage 542 for storage. Storage 542 may RAM, ROM, flash memory, a hard drive, flash drive, or any other suitable storage medium.

The image constructor 543 is configured process the images stored in the storage 542. Among other things, the image constructor 543 may include one or more programmable devices, such as a microprocessor or digital signal processor (DSP) that are programmed to obtain the stored images from storage 542 and to construct three-dimensional images based thereon, as described in greater detail below.

The optional GPS 544 is configured to identify the position and/or attitude of system 500 as it obtains images, and to provide such information to storage 542 to be stored with the corresponding images. Additionally, an accelerometer or other suitable attitude measuring device may be used determine an approximate change in attitude of the system 500 from one frame to the next in a series of images. This information may be used as part of a method to register the images to a global or relative reference frame. Power supply 545 is configured to provide power to the other components of processor subsystem 540, as well as to any powered components of illumination subsystem 510 and sensor subsystem 520.

Responsive to the control signal that controller 541 generates, modulator 524 generates a phase delay between orthogonal polarization states for pulse portions transmitted therethrough. This modulation is described in detail in the '895 patent, which subject matter is expressly incorporated herein by reference. The generated phase delay is what permits the system 500 to calculate a TOF and corresponding range value, z, for each pixel in an image, as described in the '895, which subject matter is also expressly incorporated herein by reference.

In one configuration of the system 500, first and second discrete FPAs 528, 529 and image constructor 543 constitute a means for generating a first image corresponding to received light pulse portions and a second image corresponding to modulated received light pulse portions, which may be used to obtain a three-dimensional image based thereon. For example, the first image may correspond to the sum of two complementary modulated images obtained by FPAs 528, 529 (which sum may be computed by image constructor 543, or alternatively, the sum may be computed by on-board circuitry on one or both of the FPAs), and the second image may correspond to the image obtained by FPA 529. In another configuration, a single FPA and image constructor 543 constitute a means for generating a first image corresponding to received light pulse portions and a second image corresponding to modulated received light pulse portions, which may be used to obtain a three-dimensional image based thereon. For example, the first image may correspond to the sum of two complementary modulated images obtained by a single FPA (which sum may be computed by image constructor 543), and the second image may correspond to one of the modulated images. Such configurations may include those in which modulators other than a Pockels cell-based modulator were used to modulate the light pulse portions, e.g., an electro-optic Bragg deflector or other modulator provided herein.

Figure 5:
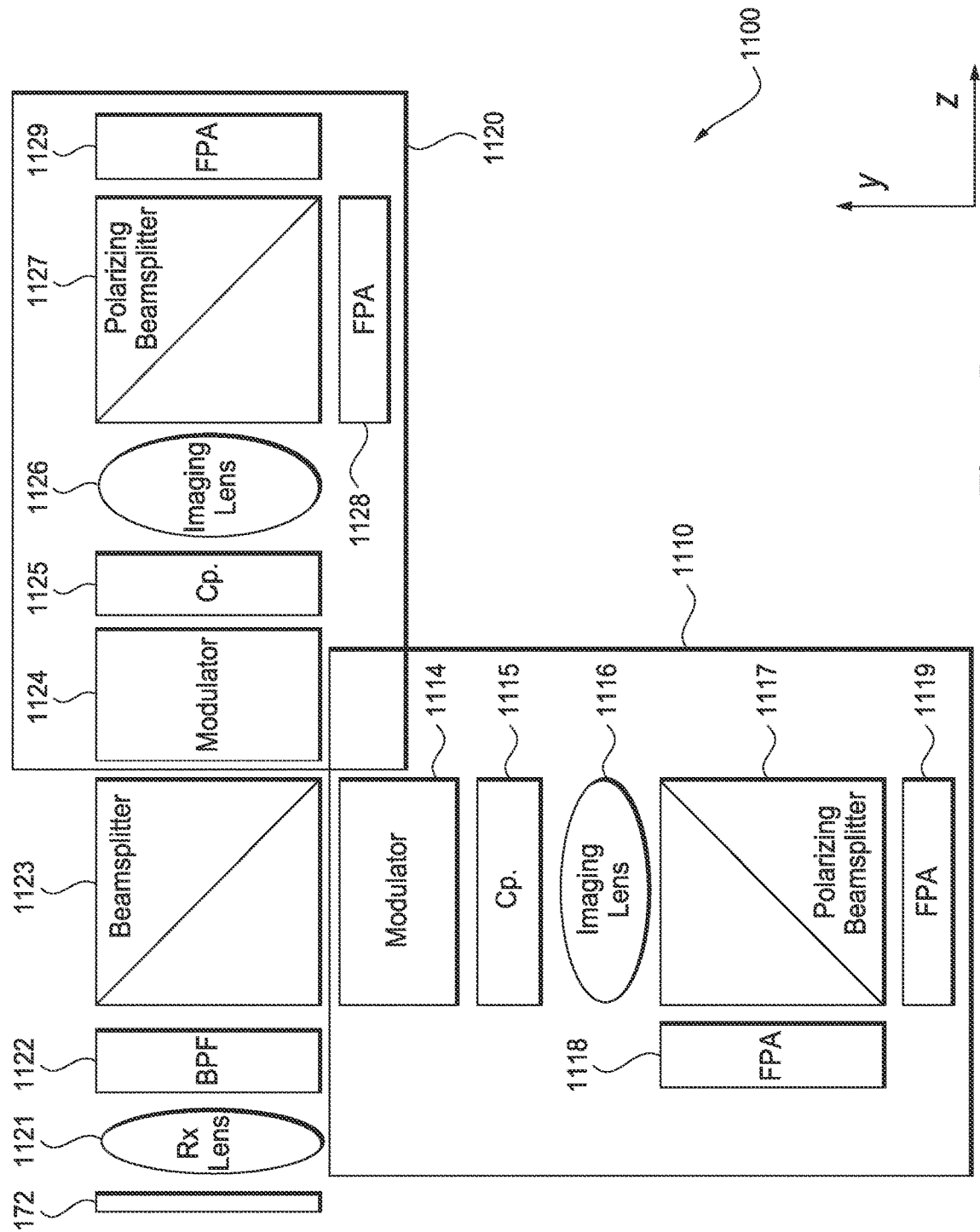
FIG. 5 schematically illustrates another exemplary 3D imaging system employing at least one of the disclosed techniques for mitigating the effect of glint on image capture.
Figure 6:
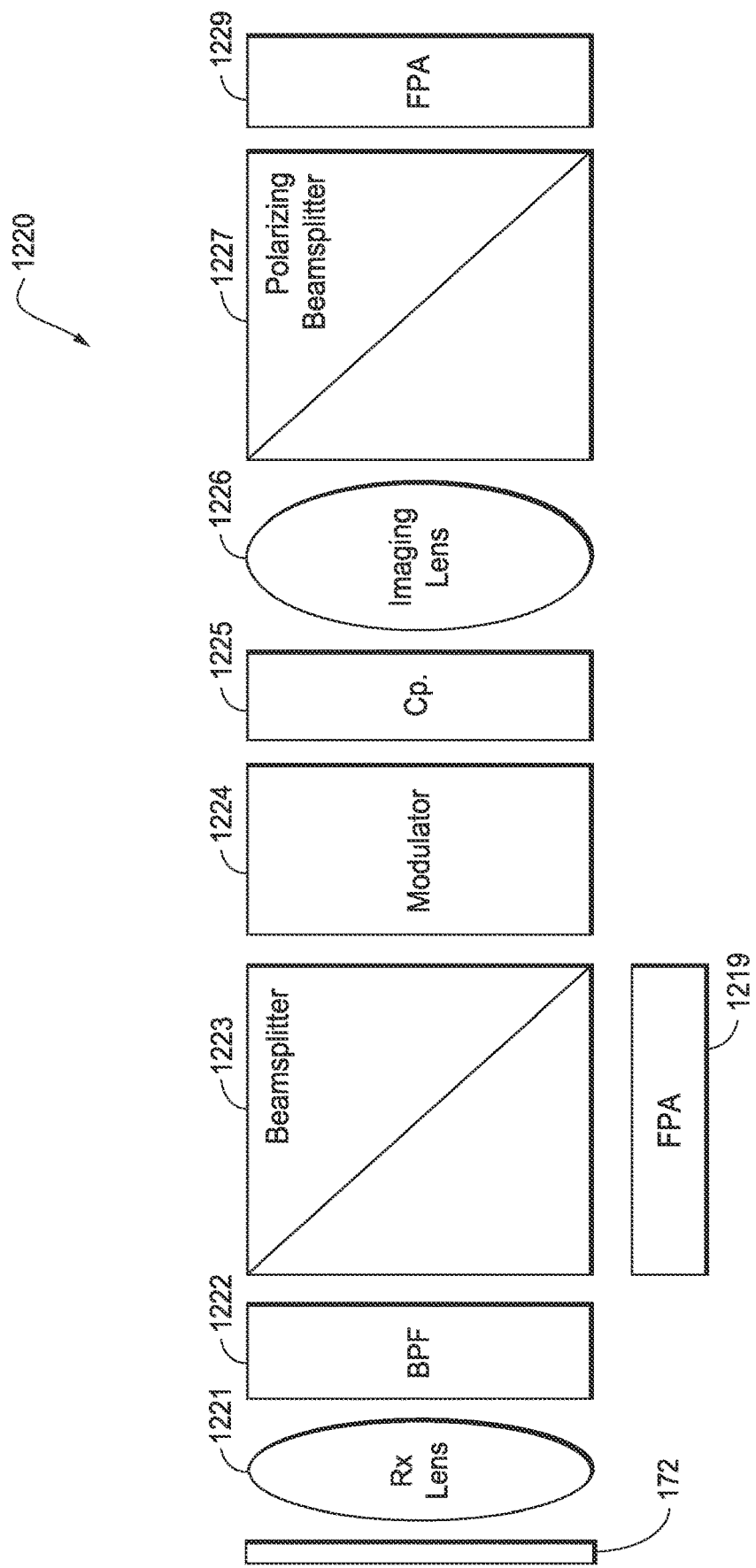
FIG. 6 schematically illustrates a further exemplary 3D imaging system employing at least one of the disclosed techniques for mitigating the effect of glint on image capture.

The polarizer 172 crossed with polarized light emitted from the illumination subsystem may be included in other embodiments of the 3D imaging systems disclosed in the '895 patent, as shown in FIGS. 5 and 6 herein. Other than the polarizer 172 and the polarized light from the illuminators, the other components of these systems 1100, 1220 and their operation are described in the '895, which subject matter is incorporated herein by reference.

Figure 7:
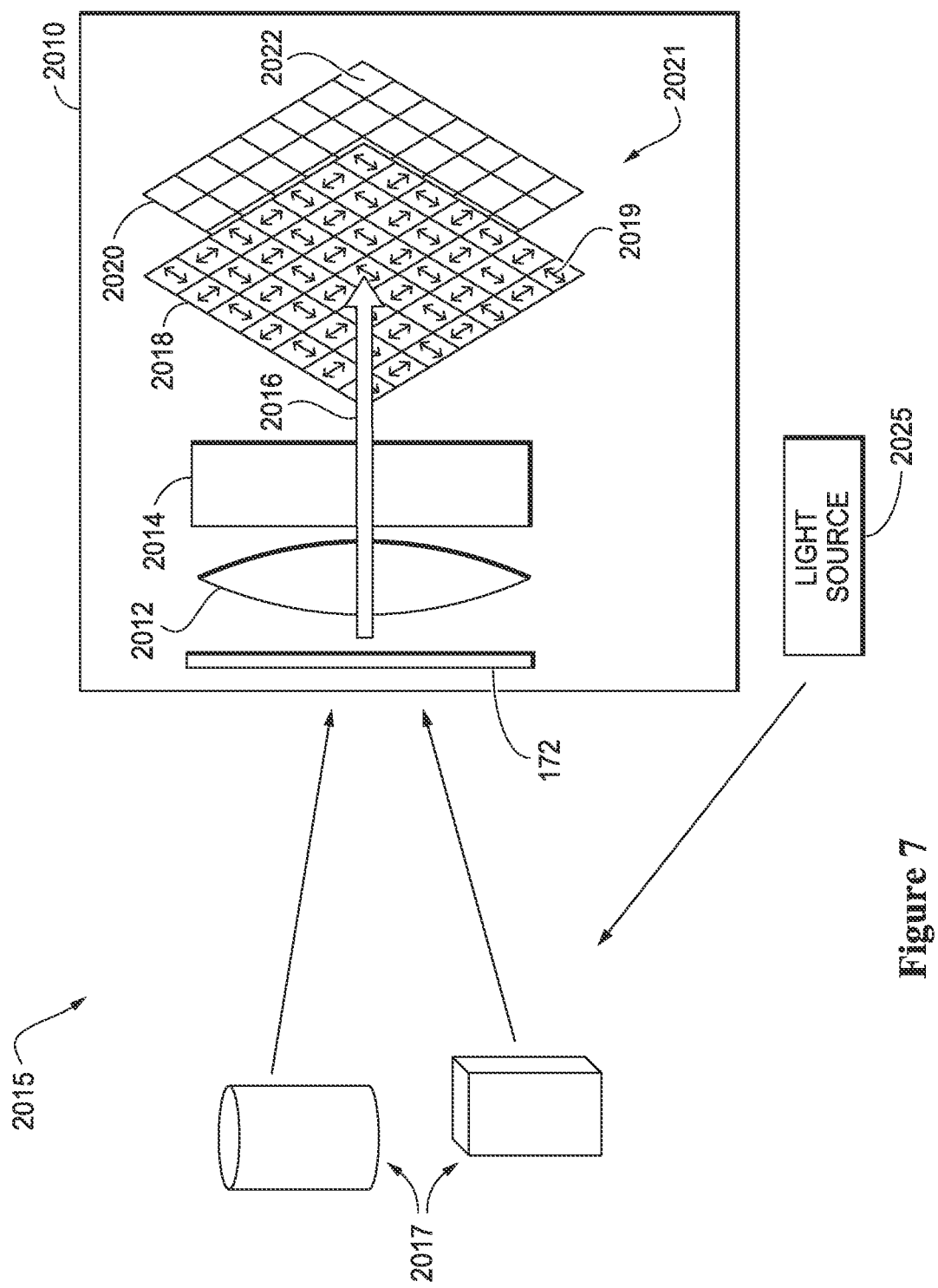
FIG. 7 is a schematic diagram of an example 3D system or camera including a modulator and a polarizing grid array and employing at least one of the disclosed techniques for mitigating the effect of glint on image capture.

FIG. 7 is a schematic diagram of another example 3D (three-dimensional) system or camera 2010 including a modulator 2014 and a polarizing grid array 2018 and employing the disclosed techniques for mitigating the effects of glint on image capture. The camera 2010 also includes the polarizer 172 that is crossed with the polarization of the light emitted from light source 2025. For the present disclosure, the laser illumination (incoming light) 2016 is imaged by the lens 2012 onto the camera sensor array 2020 through the polarizer array 2018 with a pattern of polarization directions or transmission parameters such as shown in FIG. 7. For example, the figure shows alternating horizontal and vertical linear polarizers in array 2018 arranged to be in front of each pixel 2022, but other arrangements and/or circular or elliptical polarization can be used.

For components other than the polarized light source and polarizer 172, the camera 2010 of FIG. 7 and its operation are described in U.S. published patent application 2017/0248796, entitled "3D Imaging System and Method," filed on Feb. 28, 2017, which is incorporated by reference in its entirety as if fully set forth herein (referred to herein as the "'796 application").

As shown in FIG. 7, the camera 2010 captures 3D information and may also capture image or video from a scene 2015 having objects 2017 that scatter or reflect illumination light emitted from a light source 2025. The light source 2025 may be integrated with the camera 2010 as an illumination subsystem as described in the '895 patent, or alternatively, it may be separated from the camera 2010. The light source 2025 may be any suitable means for illuminating the scene 2015 with polarized light, including those described in the '895 patent or described herein in connection with FIGS. 2-3.

Although shown as having separated elements in FIG. 7, in some configurations of the camera system 2010, the electro-optic module 2021 may include the optical modulator 2014, grid 2018, and sensor array 2020, as well as an optional polarizer (not shown) located in the optical path before the modulator 2014 integrally formed together as a single unit. This highly integrated configuration of the electro-optic module 2021 may be constructed using the lithographic, etching and deposition techniques described herein.

A compact 3D camera system may be achieved by integrating the elements of a modulated sensor approach described U.S. Pat. No. 8,471,895 B2 issued on Jun. 25, 2013, which is incorporated by reference in its entirety as if fully set forth herein (referred to herein as the "'895 patent") with a polarizing or transmission grid array. Examples of 3D imaging systems and methods that may be modified to implement the methods and systems described herein are disclosed in the '895 patent at, for example, FIGS. 1-12 and their accompanying written description in the '895 specification. Those portions of the '895 patent describe 3D imaging systems that can be configured to perform the methods and to include the polarizing or transmission grid arrays disclosed in the present application, and are specifically incorporated by reference herein.

Additionally or alternatively, the pulse light source and methods described in U.S. patent application Ser. No. 14/696,793 filed Apr. 27, 2015, entitled "Method and System for Robust and Extended Illumination Waveforms for Depth Sensing in 3D Imaging" may be used with the systems and methods disclosed herein, and the subject matter of this application is hereby expressly incorporated by reference in its entirety as though set forth fully herein.

As disclosed herein, several elements provide the capability of a more compact, monolithic design either separately or in combination. Instead of placing complex circuitry and timing algorithms behind each photosensitive pixel, the inventive techniques place the required time-dependent elements in front of each pixel or the array of pixels or photo-sensitive elements. Instead of using electronic means to affect the voltage or charge signals at each pixel, the inventive techniques use optical, electro-optic, or other means of affecting the light field in front of each pixel or groups of pixels to affect the photon signal. These optical means may be placed in close proximity to the sensor array, between the sensor array and corresponding optical elements, or in front of such optical elements to allow extraction of time or depth (e.g., z-axis distance) information from the incident light field including time-of-flight information.

The use of a modulator (external to the sensor array) as described in the '895 patent (specifically modulators 524, 700-701 1124, 1224 disclosed in the '895 patent, which description is specifically incorporated by reference herein) to encode the range information eliminates the need for costly custom sensor array or chip development, especially the challenge of scaling chips that can provide high precision timing information which have been limited to about 200 pixels. Combining the modulator approach with a polarizing grid coupled and aligned to a sensor array eliminates the need to have two separate sensor arrays and bulky polarizing components such as a polarizing beamsplitter. With a single sensor array, there is alignment and registration between two virtual arrays. The location of each polarization pixel is automatically known relatively to the pixels of the orthogonal polarization in position and angle of any surface normal. This reduces manufacturing and calibration complexity.

The use of the polarizing grid also greatly reduces the thickness of the glass or other material that is used for polarization separation elements, which reduces the amount of spherical and other optical aberrations. In prior systems, these aberrations either degraded the optical performance of the optical system of the 3D camera, or the optical system must be adapted with custom designs to remove or compensate such aberrations. With the techniques disclosed herein, the amount of aberration compensation required of optical elements is reduced or eliminated.

Additionally, the use of the polarizing grid opens the possibility of making the modulator/polarization separation/sensor array into a closely coupled or monolithic optical assembly that can be used directly with catalog optical lens or imaging elements. In some circumstances, such as wafer scale manufacturing, no lenses or relay optics would need be placed between the optical modulator and the sensor array/polarizing grid. This can reduce the size and cost of the 3D camera system.

The data streams produced and processed by the 3D camera become simpler since there is only one sensor array and no need to time with other sensor arrays. It also becomes simpler to combine multiple 3D cameras or modules together as described in the '895 patent (for example, to use different range windows and modulation waveforms to extend the range window without worsening the range resolution achievable), such as described in the '895 patent with reference to FIG. 10, which portions of the '895 patent are specifically incorporated by reference as though fully set forth herein.

As shown in FIG. 7, an electro-optic module 2021 includes a grid of polarization elements 2018 is placed in front of, or possibly on, the surface of an imaging sensor 2020 such as a charge coupled device (CCD) or complementary metal oxide semiconductor (CMOS) array of pixels. In some configurations, the polarization grid layer 2018 can be placed directly on the surface of the sensor array 2020 using an additional step or steps in the lithographic processing. In others, the grid layer 2018 can be placed on a transparent substrate that is then placed on or in front of the sensor array. In other configurations, the polarizing grid 2018 can be placed within the layers that are above the detector or electronic sites of a sensor array. The polarizing grid 2018 is aligned such that the center of each polarizing element 2019 is positioned approximately coincident with the center of each pixel 2022. For some configurations, the grid 2018 is arranged so that alternating polarizing elements pass orthogonal polarizations. For example, if the first polarizing element is oriented to pass vertical polarization, the next element in the row or column is oriented to pass horizontal polarization. Instead of linear polarizing elements, orthogonal circular polarizing element, both left-handed and right-handed, can also be used. Other configurations may use other patterns of polarizing elements, including elements that pass non-orthogonal polarizations.

Any suitable manufacturing technique may be employed to build the polarizer element array. For example, the polarizing elements 2018 can be made using a variety of techniques, including metal wire-grid polarizers, thin film polarizing layers, stressed polymers, and elements made of liquid crystal devices as well as any other technique that preferentially passes a particular polarization state over others. In some cases, the polarizing elements can be made of material that can be changed with some control signal, either between each pulse or during the pulse. Such elements can be deposited by a variety of methods using film deposition techniques. Some can be created by lithographic techniques such as interspersed exposure (including by multiple beams or wavelengths), etch, and deposition steps. Other such elements can be created by stretching or otherwise stressing materials such as polymers. Some elements can be created by e-beam or laser writing of shapes and structures of the appropriate spacing or dimensions.

For some configurations, elements that are insensitive to wavelength can be used to support 3D imagery with multiple illumination wavelengths or with broadband illumination. In other configurations, elements with narrow acceptance bandwidths can be used as the polarizing elements to more effectively discriminate between desired and undesired wavelengths of light.

By using lithographic fabrication processes, any polarizer grid to sensor array misalignment and non-uniform spacing, non-ideal polarizer performance, and cross-talk between the pixels can be reduced. Because both the polarizer grid and the sensor array can be fabricated using lithographic processes, uniformity of spacing are determined by the mask design, which is normally accurate to nanometer levels. Alignment fiducials can be used to align the two grids and lithographic precision permits accurately matching the pitch of the grid elements.

Non-ideal polarizer performance would result in location shifts of the minima and maxima of output light. This non-ideal behavior can be handled by calibration of the response at various times. Equally, imperfect polarization contrast (the ratio between the transmission of the transmitted polarization and the rejected polarization) can be managed by proper system calibration. For example, polarization contrasts of approximately 5:1, 10:1, or higher can be used with acceptable performance.

In the event of pixel cross-talk, or light or signal incident on one polarizer element reaching a pixel other than that corresponding to the polarizer element can also be accounted for by calibration. Different calibrations can be performed to account for any changes in the cross-talk that may occur over short or long time scales. Such calibration can be performed at a single time or may be performed at several times or during the operation of the 3D camera. Such calibrations can be implemented using lookup tables (LUTs) or other functions or forms.

An effect may be performance changes as the angle content of the incident light changes, for example by changing the f/# of the collecting optics. Higher f/# optics may be used to reduce cross-talk.

Some configurations may reduce cross-talk by constructing the polarizing grids to use opaque separator bands or structures between pixels. Such bands or structures reduce the amount of light that can cross from one pixel position to neighboring pixel positions or pixels. In some configurations, such bands or structures may also reduce overall effective transmission efficiency. Other structures can be implemented to reduce cross-talk, including structures on either side of the substrate. For example, opaque or reflective structures can be created in the space between pixels that would block light that is transmitted through the grid element from being transmitted to the detector of a neighboring pixel. Such structures or bands may be placed in front of the polarizer array, behind the polarizer array, within the layers of the sensor array, or around the photosite or photosites of the sensor array, as well as within the polarizer array itself. In some configurations, guard pixels between the polarization states could be used where the signal is ignored. For example, if the sensor array pixel size is small, for example three microns, a polarizer element might be nine microns wide with a three micron separator that covers the guard pixels. Alternatively, guard pixels could be used with no special separation existing on the grid structure between elements.

For some configurations, some of the elements of the polarizer array may have no polarization properties or reduced polarization properties, forming the basis to determine the normalization signal. Any suitable arrangement of polarization elements and non-polarization elements in the grid can be used depending on the application and system design. These non-polarization elements can be approximately uniform in transmission for multiple wavelengths or they can vary similar to Bayer patterns for color cameras or different filters for IR or thermal cameras or other arrangements at other wavelengths or wavelength regions. For example, they may be opaque or less transmissive of light.

In some arrangements, the polarizer grid elements can be larger than a single pixel of the sensor array, for example 2×2, 3×3, 4×4, or other multiple. The elements can also be rectangular, for example, 2×1, 3×2, or other multiple or aspect ratio or any other arrangement that is non-rectangular in shape. If the grid elements are larger than one pixel, the transmissive elements may be further divided into individual areas that transmit different amounts based on wavelength or angle or other similar optical property.

In the processing software, the detected signal from the pixels in the sensor array 20 can be binned or otherwise processed to improve the robustness of the measurement, reduce sensitivity to noise or other deleterious effects, or otherwise improve the signal to noise ratio of the individual measurements. Values from different elements or different types of elements can be combined in many ways, depending on the algorithm implemented and the result desired.

Alternatively, for other modulation schemes, such as Fabry-Perot cavities or other phase-based modulation schemes, where polarization modulation is not used, arrays of elements that vary in transmission between elements in some pattern similar to that described above can be employed instead of polarization elements. Some elements can be relatively low transmission that may provide the needed finesse for a Fabry-Perot cavity while some elements can be relatively high transmission. The high transmission elements (coupled with high transmission elements on the other side of the Fabry Perot cavity) can be used to determine the unmodulated reference signal, including interpolating the signal to the lower transmission elements for determination of the relative modulation signal as described in the base patent. The arrangement of these pixels can be grouped in various ways, as described in more detail below.

For other configurations, the gain of individual pixels, columns, rows, or other arrangements of groups of pixels in the sensor arrays can be adjusted or set to different values to reduce contrast between the groups of elements where there is significant signal or to increase the contrast between pixels or groups of pixels where there is lower signal, thereby increasing the dynamic range of the sensor or 3D camera. Some configurations could make use of additional filters that change transmission in front of pixels or groups of pixels. For example, a Bayer pattern RGB filter could be used or other pattern of differing transmissive properties. Such filter elements could also be used where multiple wavelengths of light are used, either for illuminating the scene for the 3D camera or for acquiring specific background or ambient illumination.

An improved way of eliminating the bulky optics that have been previously used in some 3D cameras to separate polarization states is to place a polarizing element in front of each pixel of a sensor array. Such micro-grid polarizing arrays can be used to measure the absolute or relative time-of-flight. Absolute distance measurements can be used in a 3D camera, for among other things, to reduce error buildup, particularly where multiple objects or surfaces are within the scene and where they are not connected, or the connection is not visible from the camera.

Figure 8:
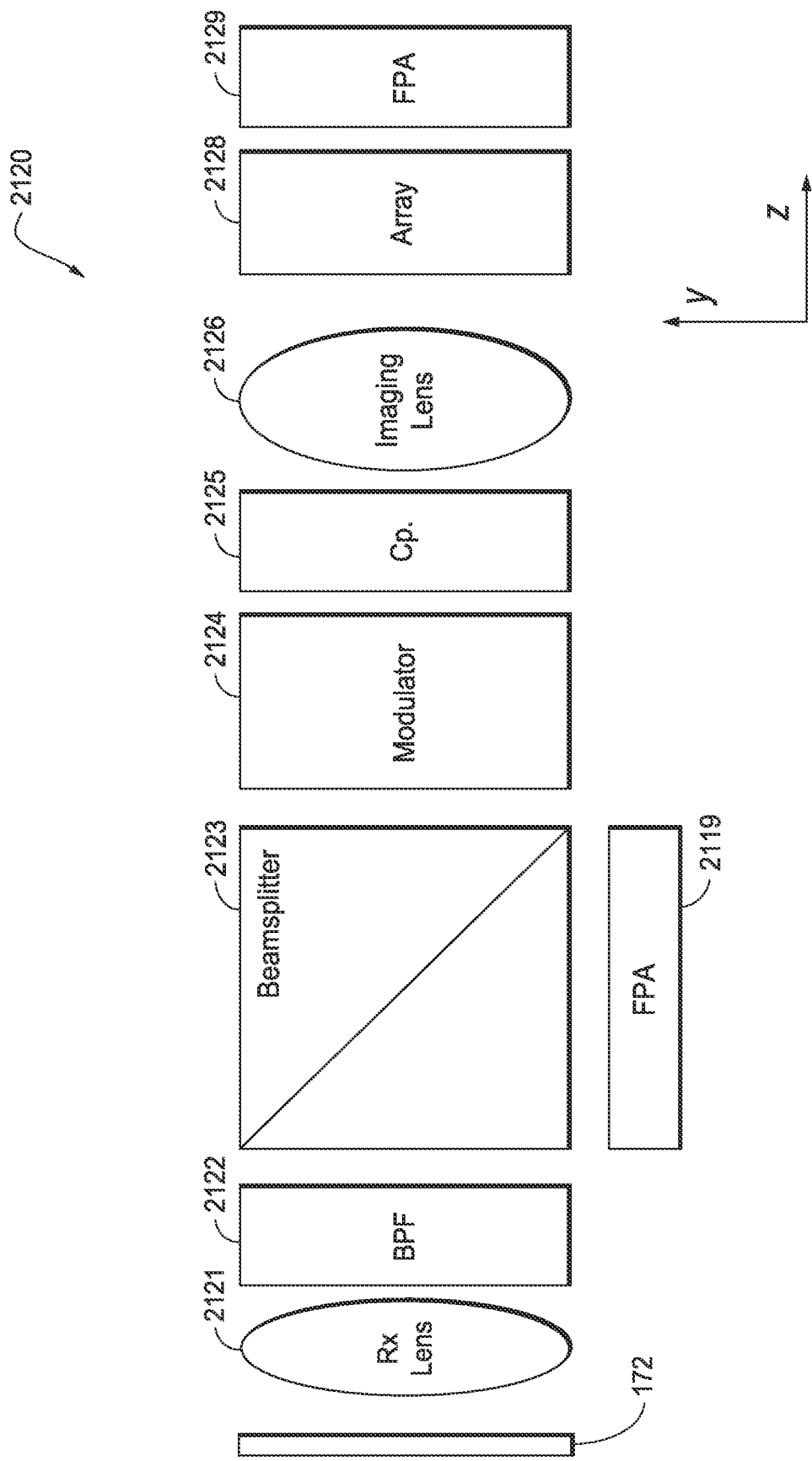
FIG. 8 schematically illustrates another example of a 3D imaging system including a modulator and a polarizing grid array and employing at least one of the disclosed techniques for mitigating the effect of glint on image capture.

FIG. 8 schematically illustrates another example of a 3D imaging system 2120 including the polarizer 172, a modulator 2124 and a polarizing grid array 2128 and employing the disclosed techniques for mitigating the effects of glint on image capture. Sensor system 2120 optionally may include visible imaging subsystem 530 show and described in connection with FIG. 5 of the '895 patent, which portions of the '895 patent are specifically incorporated by reference as though set forth in their entirety herein. The subsystem 530 is omitted from FIG. 8 for clarity.

The system 2120 includes polarizer 172, receiving (Rx) lens 2121, band-pass filter (BPF) 2122, modulator 2124, compensator (Cp.) 2125, optional imaging lens 2126, and FPA 2129, each of which may be the same as described with respect to the corresponding components illustrated in FIG. 5 of the '895 patent (except for polarizer 172), such description of the FIG. 5 elements of the '895 patent being specifically incorporated by reference as though fully set forth herein. However, system 2120 also includes polarizer 172 and element array 2128, which may be any of the polarizing arrays or transmission-based arrays described, for example, with reference to FIGS. 2-7 of the '796 application, which subject matter is incorporated herein by reference.

Some configurations may use all camera elements shown in FIG. 5 of the '895 patent. For example, the system 2120 can include optional beamsplitter 2123 which is at any suitable position before the modulator (here, between bandpass filter 2122 and modulator 2124), which directs a portion of the received light to FPA 2119, which obtains an image of the scene based thereon. The remainder of the light is transmitted to modulator 2124, which modulates the light transmitted there through, and FPA 2129 obtains an image of the scene based thereon. In some configurations, the images obtained by FPA 2119 and FPA 2129 may differ in that the former is based on unmodulated light, while the latter is based on modulated light. The image obtained by FPA 2119 may be used to normalize the image obtained by FPA 2129. Specifically, the intensity at any pixel (i,j) of FPA 2119 may be used as the value $I_{total,i,j}$ in the distance calculations discussed in the '895 patent with reference to equations (8) to (15), which subject matter is specifically incorporated by reference as if fully set forth herein. Alternatively, in some configurations the intensities measured by FPA 2119 are not needed, instead using the demosaiced intensity sum from FPA 2129 as described above.

In other configurations, FPA 2119 is used for images a different wavelength or wavelengths, such as visible light or infrared light or other spectral region. In other configurations, some of the components shown may be omitted or changed in order. For example, in some configurations, the beamsplitter 2123 may be replaced by another variety of polarizing plate or optic or for some instances, omitted altogether if the incident polarization state is of sufficient quality. In some configurations, the compensator 2125 and/or imaging lens can be omitted. The bandpass filter 2122 can also be omitted for suitable environments where background light can be neglected. Alternatively, the components 2124 through 2128 or some subset thereof can be repeated in other configurations between beamsplitter 2123 and the FPA 2119. The modulation patterns between FPA 2119 and 2129 can be the same or of different lengths or other differences in shape or structure, as described in the '895 patent. The signals obtained from either or both of the FPAs 2119, 2129 can be combined in algorithms described in the '895 patent.

In other embodiments of sensor 2120, the beamsplitter 2123, imaging lens 2126, and FPA 2119 are omitted.

Other techniques described in the '895 patent can be combined with a 3D camera using such a transmission array disclosed herein.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently rather than sequentially. In addition, while certain aspects of this disclosure are described as being performed by a single module or component for purposes of clarity, it should be understood that the glint reduction techniques of this disclosure may be performed by any suitable combination or number of components or modules associated with an imaging or sensor system.

The foregoing description is illustrative and not restrictive. Although certain exemplary embodiments have been described, other embodiments, combinations and modifications involving the system(s) and method(s) disclosed will occur readily to those of ordinary skill in the art in view of the foregoing teachings.

The invention claimed is:

1. A method of reducing glint from a returned electromagnetic radiation signal in an active illumination 3D imaging system so as to avoid saturation effects that introduce errors in distance calculation, comprising:

illuminating a scene with an electromagnetic radiation signal having a predetermined first polarization, the electromagnetic radiation signal configured for providing illumination distributed uniformly across a field of view representing the scene, in which an object in the field of view produces specular reflection that would introduce the saturation effects;

receiving, at a receiver, the returned electromagnetic radiation signal that is scattered or reflected from the scene as a result of illuminating the scene with the electromagnetic radiation signal;

passing the returned electromagnetic radiation signal through a polarizer included in the receiver to establish a filtered portion of the returned electromagnetic radiation signal, the polarizer having a second polarization that differs from the predetermined first polarization of the electromagnetic radiation signal so that the specular reflection produced from the object is reduced to be within a dynamic range of the active illumination 3D imaging system;

modulating the filtered portion of the returned electromagnetic radiation signal as a function of time and thereby generate a modulated returned portion having its intensity vary as a function of distance in the field of view;

converting into one or more electrical signals the modulated returned portion of the electromagnetic radiation signal; and determining 3D information regarding the scene based on the electrical signals, in which the determining includes calculating a distance to the object according to its corresponding electrical signals representing the intensity that varies while falling within the dynamic range of the active illumination 3D imaging system.

2. The method of claim 1, wherein the polarizer is orthogonally crossed with the predetermined first polarization.

3. The method of claim 1, wherein the polarizer is a plastic sheet polarizer.

4. The method of claim 1, wherein the polarizer is a thin film polarizer.

5. The method of claim 1, wherein the polarizer is a crystal polarizer.

6. The method of claim 1, wherein the polarizer is selected from the group consisting of a linear polarizer, a circular polarizer, and elliptical polarizer.

7. The method of claim 1, wherein the electromagnetic radiation signal is a pulse having a duration of 100 nS or less.

8. An active illumination 3D imaging system configured to reduce glint from a returned electromagnetic radiation signal to avoid saturation effects that introduce errors in distance calculation, comprising:

an illuminator configured to illuminate a scene with electromagnetic radiation having a predetermined first polarization, the electromagnetic radiation signal configured for providing illumination distributed uniformly across a field of view representing the scene, in which an object in the field of view produces specular reflection that would introduce the saturation effects;

a sensor subsystem including:
a polarizer having a second polarization that differs from the predetermined first polarization of the electromagnetic radiation, the polarizer configured to receive the returned portion of the electromagnetic radiation returned from the scene so as to establish a filtered portion with the specular reflection produced from the object reduced to be within a dynamic range of the active illumination 3D imaging system;

a modulator configured to modulate the filtered portion of the electromagnetic radiation as a function of time and thereby generate a modulated returned portion having its intensity vary as a function of distance in the field of view; and a sensor configured to receive the filtered portion of the electromagnetic radiation and generate one or more electrical signals; and a processor, operatively coupled to the modulator and sensor, configured to compute 3D information regarding the scene based on the one or more electrical signals from the sensor by calculating a distance to the object according to its corresponding electrical signals representing the intensity that vanes while falling within the dynamic range of the active illumination 3D imaging system.

9. The system of claim 8, wherein the polarizer is orthogonally crossed with the predetermined first polarization.

10. The system of claim 8, wherein the illuminator is configured to emit one or more electromagnetic radiation pulses each having a duration of 100 nS or less.

11. The system of claim 8, wherein the polarizer has an extinction ratio of about $10^4:1$.

12. The system of claim 8, wherein the polarizer is a thin film polarizing beamsplitter.

* * * * *